United States Patent [19]
Kume

[11] Patent Number: 6,032,254
[45] Date of Patent: *Feb. 29, 2000

[54] METHOD OF IDENTIFYING PERIPHERAL DEVICE EMPLOYED IN A SEMICONDUCTOR DEVICE

[75] Inventor: Hiroshi Kume, Tokyo, Japan

[73] Assignee: Oki Electric Industry Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/825,465

[22] Filed: Mar. 28, 1997

[30] Foreign Application Priority Data

Apr. 26, 1996 [JP] Japan ................................ 8-107233

[51] Int. Cl.[7] ........................... G06F 9/445; G06F 13/00
[52] U.S. Cl. .................................. 713/2; 710/8; 713/100
[58] Field of Search ............................... 395/652, 653, 395/828, 836; 713/2, 100; 710/8, 16

[56] References Cited

U.S. PATENT DOCUMENTS

| | | |
|---|---|---|
| 3,881,174 | 4/1975 | Barnich . |
| 5,345,564 | 9/1994 | Jensen et al. . |
| 5,603,055 | 2/1997 | Evoy et al. ............................. 395/652 |
| 5,671,413 | 9/1997 | Shipman et al. ....................... 395/652 |
| 5,734,911 | 3/1998 | Lai ......................................... 395/742 |

*Primary Examiner*—Ayaz R. Sheikh
*Assistant Examiner*—Tim Vo
*Attorney, Agent, or Firm*—Rabin & Champagne, P.C.

[57] ABSTRACT

Control programs for a peripheral device to be installed, an identification program for identifying specifications of the peripheral device and a program for selecting the corresponding control program according to their identification are prepared and executed. Thus, since it is unnecessary to manage only the corresponding control program so as to be stored in a semiconductor device every specifications of the peripheral device, the fabrication of the semiconductor device is prevented from increasing in complexity.

20 Claims, 8 Drawing Sheets

METHOD OF IDENTIFYING PERIPHERAL DEVICE EMPLOYED IN A SEMICONDUCTOR DEVICE

BACKGROUND OF THE INVENTION

1. Field of the Invention

This invention relates to a semiconductor device having a microprocessor (hereinafter called "MPU"), and particularly to a method of identifying specifications of a peripheral device such as a non-volatile memory or the like used by being electrically connected to an input/output port (hereinafter called "I/O port") of the semiconductor device.

2. Description of the Related Art

In addition to a read-only memory (hereinafter called "ROM") for storing control programs therein and a random-access memory (hereinafter called "RAM") for writing processing data therein and reading it therefrom, a peripheral device is installed in a semiconductor device equipped with a recent MPU so that the extension or the like of its processing operation can be performed in cooperation with the MPU. The peripheral device is electrically connected to the MPU or the like through an I/O port of the semiconductor device. Various specifications are provided for the peripheral device. Even in the case of a non-volatile memory corresponding to one peripheral device, for example, there are known two types: one which is used as a two-wire type wherein a peripheral device is electrically connected to an MPU at two connecting terminals and another which is used as a five-wire type wherein a peripheral device is electrically connected to an MPU at five connecting terminals. Thus, since the peripheral devices installed in semiconductor devices are different from each other in specifications (the number of connecting terminals), it is necessary to prepare or provide control programs corresponding to their peripheral devices. Further, since there is one which is not equipped with the peripheral device, it is necessary to prepare control programs for its sake.

Such control programs are to be stored in the ROM incorporated in the semiconductor device together with the MPU or a memory incorporated in the MPU.

In such a case, however, the semiconductor device must include individually prepared ROMs storing therein the control programs corresponding to the presence or absence of provision of each peripheral device or the specifications of the peripheral devices. Thus, the fabrication of the semiconductor device becomes complex.

Particularly when the control programs are set in the memory incorporated in the MPU, photomasks for manufacturing the MPU must be prepared for every type of control program stored in the built-in memory. Thus, the MPU not only increases in fabrication complexity, but also increases in manufacturing cost.

It is also hard to mass-produce the semiconductor device due to the fact that its fabrication becomes complex.

With the foregoing problems in view, it is an object of the present invention to provide a semiconductor device capable of overcoming the requirement for complexity in process of its fabrication, an increase in its cost, and difficulties in its mass production and carrying out its manufacture in common with others regardless of specifications of a peripheral device.

It is another object of the present invention to realize the above object without adding a special configuration to the semiconductor device.

SUMMARY OF THE INVENTION

According to one aspect of the present invention, for achieving the above objects, there is provided a method of identifying a peripheral device employed in a semiconductor device which is equipped with a microprocessor, wherein the peripheral device is capable of being electrically connected to the microprocessor at at least first and second connecting terminals and executing operations in cooperation with the microprocessor, the method of comprising the following steps:

a first step for reading an identification program for identifying the peripheral device, from a first memory;

a second step for outputting a signal to the first connecting terminal;

a third step for receiving a signal outputted from the second connecting terminal;

a fourth step for comparing the signal outputted in the second step and the signal received in the third step;

a fifth step for identifying the peripheral device based on the result of comparison obtained in the fourth step; and a sixth step for storing the result of identification in the peripheral device.

Further, in order to achieve the above objects, the semiconductor device includes first means for outputting the signal to the first connecting terminal, second means for receiving the signal outputted from the second connecting terminal, comparing means for comparing the signal outputted from the first means and the signal received by the second means and identifying means for identifying the peripheral device based on the result of comparison obtained by by the comparing means.

Moreover, in order to achieve the above objects, the first means, the second means, the comparing means and the identifying means are constituted as the microprocessor.

According to another aspect of the present invention, for achieving the above objects, there is provided a method of identifying a peripheral device employed in a semiconductor device, which is equipped with a microprocessor, wherein the peripheral device is capable of being electrically connected to the microprocessor at at least first through fourth connecting terminals, of executing operations in cooperation with the microprocessor and of being installed therein according to its specifications, the method comprising the following steps:

a step for storing an identification program for identifying the peripheral device employed in the semiconductor device, in a first memory;

a step for outputting signals to the first and third connecting terminals respectively;

a step for receiving signals outputted from the second and fourth connecting terminals respectively;

a step for comparing the signals outputted in the outputting step and the signal received in the receiving step;

a step for identifying the peripheral device based on the result of comparison obtained in the comparing step; and a step for storing the result of identification in a second memory.

Further, in order to achieve the above objects, the semiconductor device has first means for outputting the signals to the first and third connecting terminals respectively, second means for receiving the signals outputted from the second and fourth connecting terminals respectively, comparing means for comparing the signals outputted from the first means and the signals received by the second means, and identifying means for identifying the peripheral device based on to the result of comparison obtained by the comparing means.

Moreover, in order to achieve the above objects, the comparing means performs comparisons between the signals at the first and second connecting terminals and between the signals at the third and fourth connecting terminals and the identifying means identifies the type of peripheral device installed in the semiconductor device from the results of comparisons performed by the comparing means.

Typical ones of various present inventions have been described in brief. However, the various inventions and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described in detail with reference to the accompanying drawings.

Figure 1:
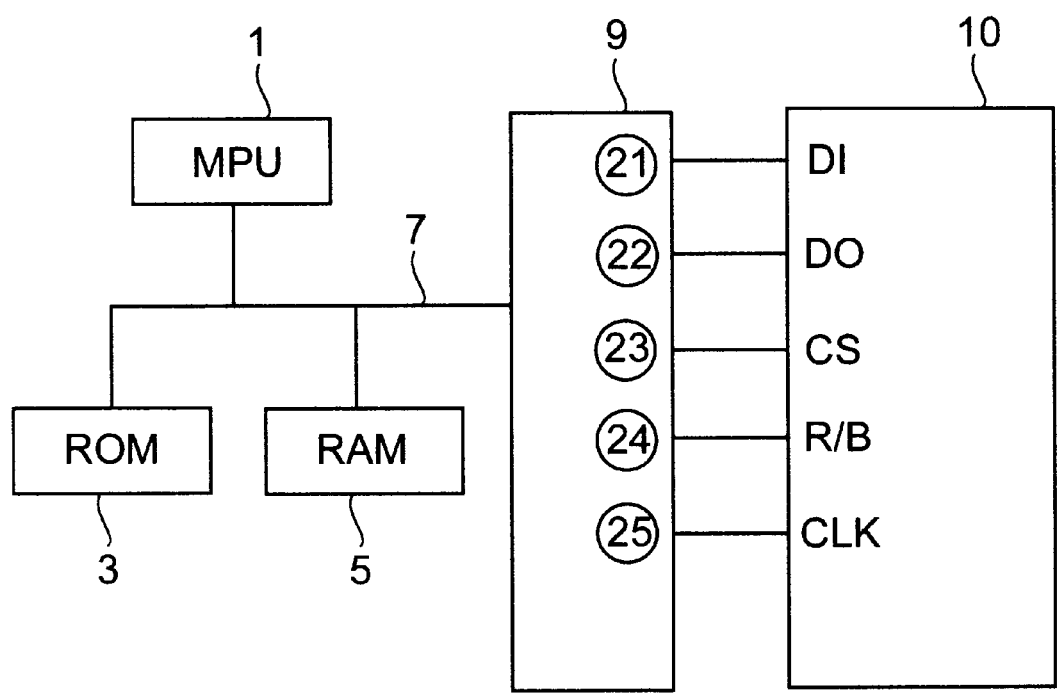
FIG. 1 is a block diagram showing the configuration of a semiconductor device according to a first embodiment of the present invention.

FIG. 1 is a block diagram showing the structure of a semiconductor device according to a first embodiment. In FIG. 1, reference numerals 1, 3, 5, 7, 9 and 10 designate an MPU, a ROM, a RAM, a plurality of bus lines, an I/O port and a peripheral device respectively. The ROM 3 is used to store control programs, an identification program, etc. The RAM 5 is used to write data processed by the semiconductor device therein and read it therefrom. The plurality of bus lines 7 are respectively electrically connected to the MPU 1, ROM 3 and RAM 5 and are used for the transfer of signals between these. The I/O port 9 is used to output data transferred from the bus lines 7 to the peripheral device 10 or receive data sent from the peripheral device 10 and transfer it to the bus lines 7. In the present embodiment, the peripheral device 10 is a five-wire type non-volatile memory.

A data input terminal D1 of the non-volatile memory 10 is electrically connected to a terminal 21 of the I/O port 9. A data output terminal DO is electrically connected to a terminal 22 of the I/O port 9. A chip select terminal CS is electrically connected to a terminal 23 of the I/O port 9. A ready/busy terminal R/B is electrically connected to a terminal 24 of the I/O port 9. A clock terminal CLK is electrically connected to a terminal 25 of the I/O port 9. Therefore, the non-volatile memory 10 is able to transfer data between the non-volatile memory 10 and the MPU 1 or the like through the I/O port 9. Here, the term data is called "data" inclusive of control signals used for control of various operations as well as address data and processing data used for arithmetic operation or the like.

Figure 2:
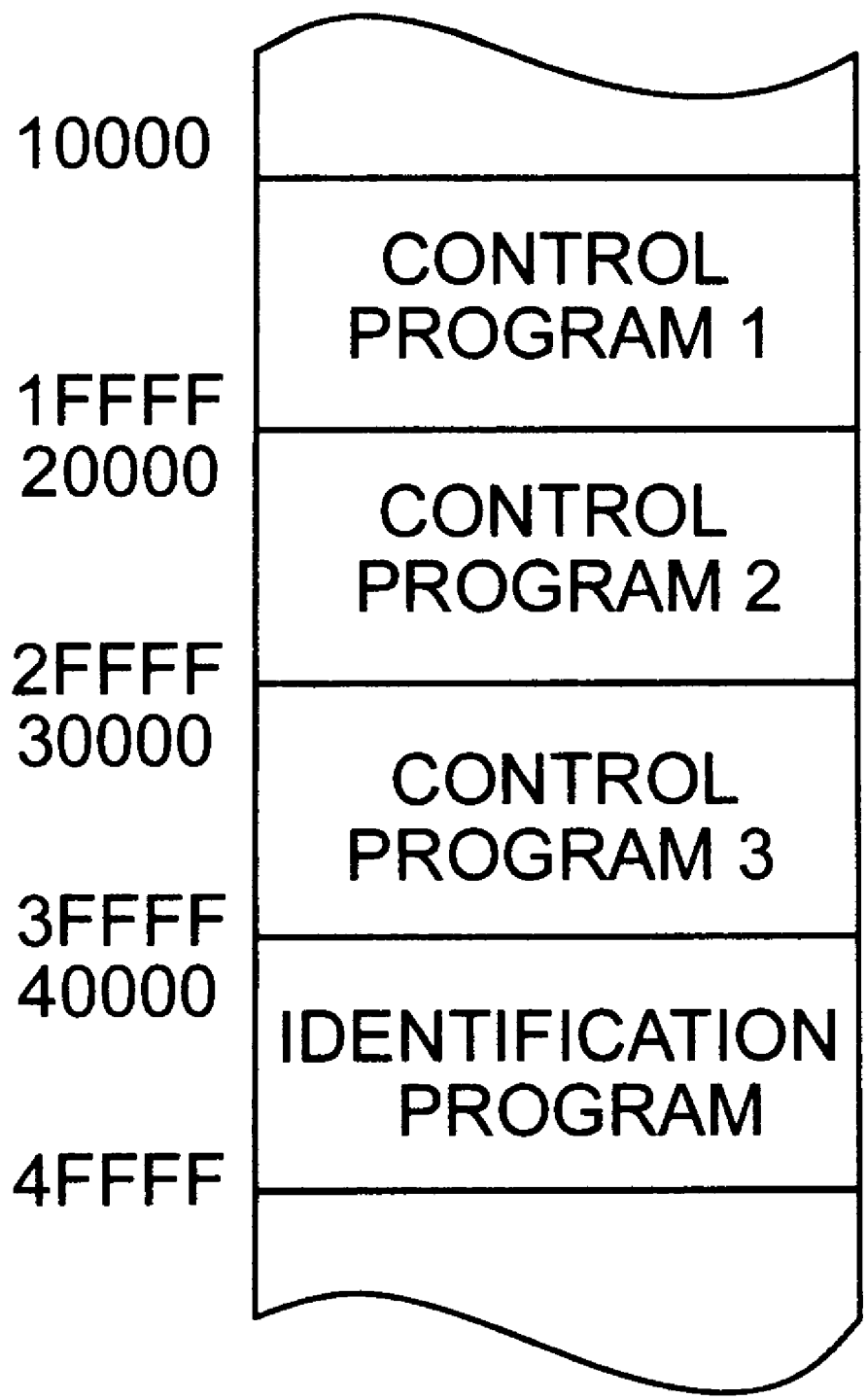
FIG. 2 is a schematic diagram illustrating a memory region defined within a ROM 3 storing an identification program and control programs therein.

FIG. 2 is a schematic diagram for describing a memory region defined within the ROM 3 in which the identification program and the control programs have been stored.

A control program 1 intended for control corresponding to a case where the peripheral device is of the five-wire type non-volatile memory, is stored within the ROM 3 between addresses 1000 and 1FFFF as shown in FIG. 2 by way of example. A control program 2 intended for control corresponding to a case in which a peripheral device to be described later is of a two-wire type non-volatile memory, is stored within the ROM 3 between addresses 20000 and 2FFFF. Further, a control program 3 intended for control corresponding to a case in which no peripheral device is provided, is stored within the ROM 3 between addresses 30000 and 3FFFF. Moreover, an identification program for identifying the specifications of the peripheral device is stored between addresses 40000 and 4FFFF. Although the control programs and the identification program are stored in a sequential region of the addresses 10000 through 4FFFF in the present embodiment, the programs do not necessarily require continuous storage if it is possible to perform program read control.

Figure 3:
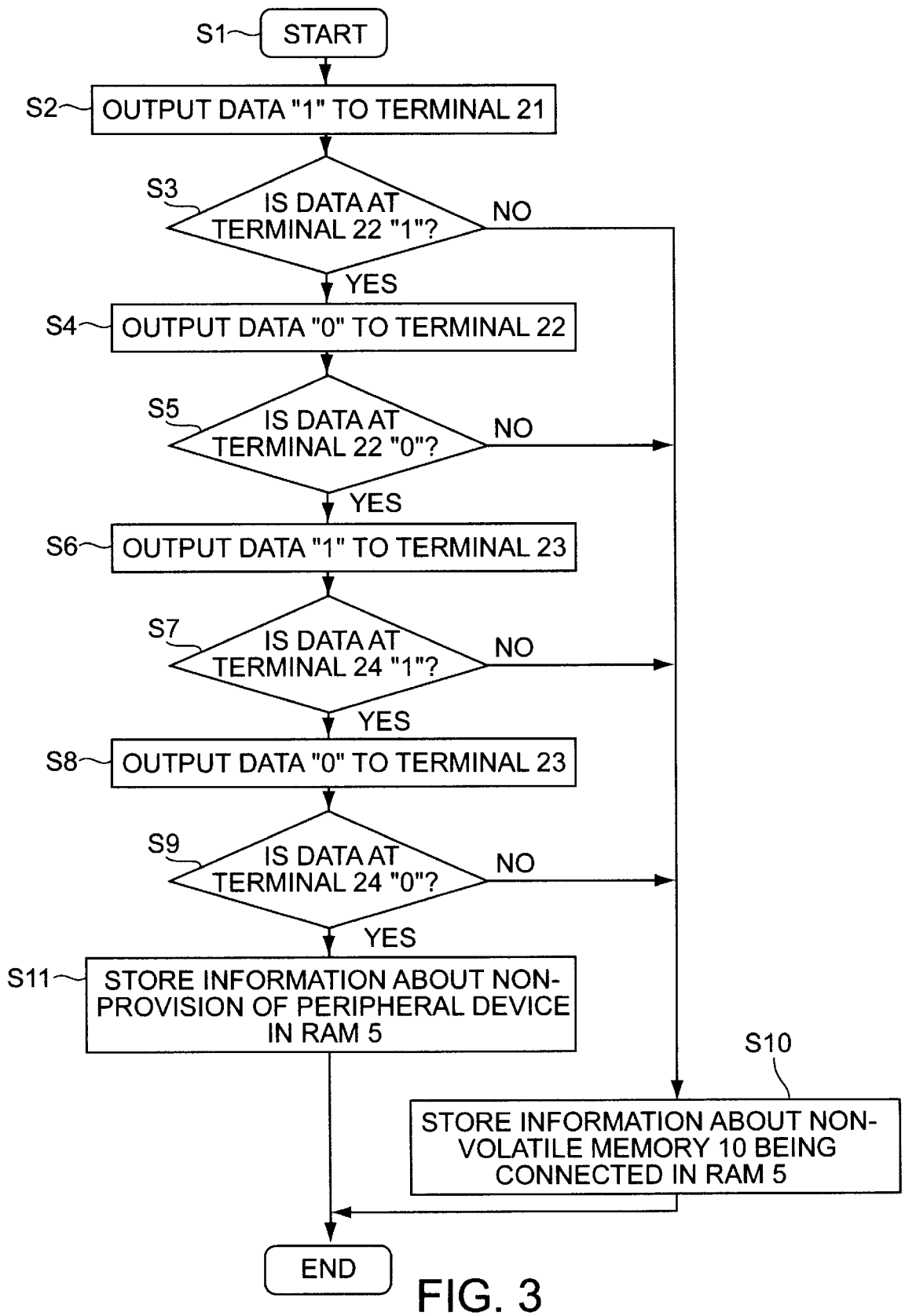
FIG. 3 is a flowchart for describing the contents of execution of the identification program shown in FIG. 2.

FIG. 3 is a flowchart illustrating the contents of execution of the identification program shown in FIG. 2.

When a power supply for the semiconductor device is turned on and the MPU 1 is reset, the identification program is read from the ROM 3 by the MPU 1 and executed according to initial setting operations such as the initialization of the RAM 5, etc.

Referring to FIG. 3, the MPU 1 first starts the execution of the identification program as Step S1 as described above. In Step S2, the MPU 1 outputs data "1" to the terminal 21 of the I/O port 9. The data sent from the I/O port 21 is transferred to the input terminal D1 of the non-volatile memory 10. In Step S3, the MPU 1 confirms whether data received at the terminal 22 of the I/O port 9 is identical to the data inputted from the terminal 21. In FIG. 1, the terminal 22 is electrically connected to the output terminal DO of the non-volatile memory 10 and the non-volatile memory 10 is not yet supplied with output instructions because of the time of initial setup. Therefore, an unstable output, e.g., an output brought into a high impedance state or fixed, such as data "0" is outputted from the terminal 22. Thus, since the high impedance state or the data "0" is held at the terminal 22, the above data is found not to be coincident with the data inputted from the terminal 21 in Step S3. Thus, the non-volatile memory 10 is recognized or identified as having been connected as the peripheral device as defined in Step 10. The recognized information is written into a predetermined address in the RAM 5.

As mentioned above, the data received at the terminal 22 of the I/O port 9 has been described as "0" or the high impedance state corresponding to the initial output of the non-volatile memory 10. However, when the data received at the terminal 22 is of "1" (when the initial output of the non-volatile memory 10 is "1"), the data inputted from the terminal 21 coincides with the data received at the terminal 22. In this case, the MPU 1 proceeds to Step S4. In Step S4, the MPU 1 inputs the data "0" to the I/O port 9. In Step S5, the MPU 1 confirms whether the data received at the terminal 22 of the I/O port 9 is identical to the data inputted from the terminal 21. Since the data "1" is being received at the terminal 21, the data "1" does not coincide with the data "0" inputted from the terminal 21. Therefore, the MPU 1 performs the processing of Step S10 referred to above.

It is thus possible to recognize that the non-volatile memory 10 has been connected as the peripheral device.

Figure 4:
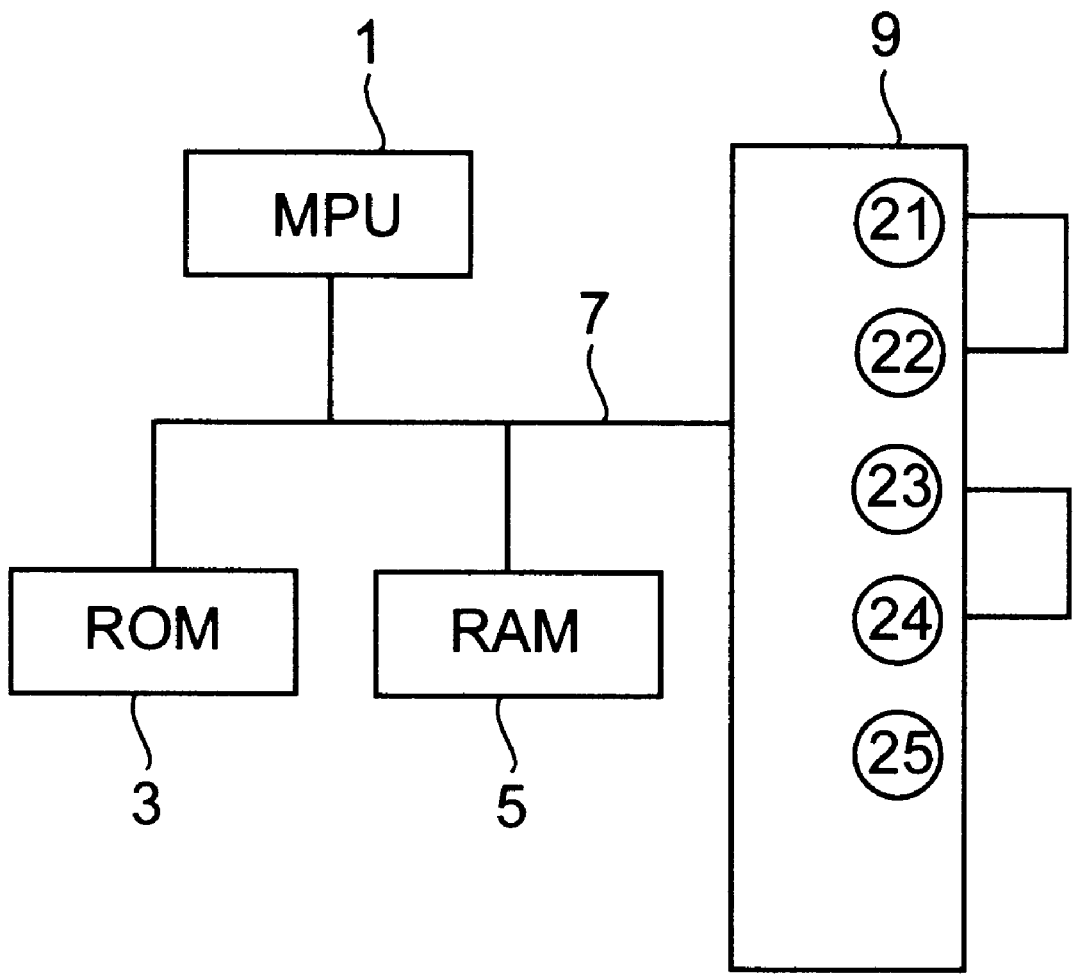
FIG. 4 is a schematic block diagram showing a semiconductor device which is not equipped with a peripheral device.

A description will next be made of the case in which a semiconductor device is not equipped with a peripheral device. FIG. 4 is a schematic block diagram showing the semiconductor device unequipped with the peripheral device. In FIG. 4, the same elements of structure as those shown in FIG. 1 are identified by the same reference numerals.

Referring to FIG. 4, the semiconductor device is characterized by short-circuiting terminals 21 and 22 of an I/O port 9 and terminals 23 and 24 thereof and providing electrical connections between the terminals 21 and 22 and between the terminals 23 and 24. Therefore, when data "1" and data "0" are inputted from the terminal 21 upon execution of the identification program shown in FIG. 3 (Steps S2 and S4), they are supplied to the terminal 22. Thus, the data inputted from the terminal 21 coincides with the data received at the terminal 22 (Steps S3 and S5). Similarly, the data "1" is thereafter inputted from the terminal 23 (Step S6). Further, confirmation is made as to whether the data inputted from the terminal 23 has coincided with data received at the terminal 24 (Step S7). Moreover, the data "0" is inputted from the terminal 23 (Step S8) and confirmation is made as to whether the data inputted from the terminal 23 has coincided with the data received at the terminal 24 (Step S9). Since the matching is detected even upon this coincidence confirmation, the MPU 1 can recognize a process of Step S11, i.e., recognize that the semiconductor device is not equipped with the peripheral device. This recognized information is written into a predetermined address of a RAM 5.

Thus, the specifications (the presence or absence of the peripheral device till the above description) of the peripheral device can be confirmed by executing the identification program and its confirmed information can be stored.

Now, the execution of the identification program needs at least means (Steps S2, S4, S6 and S8) for producing the data "1" and "t" at the terminals 21 and 23 and out putting them therefrom, means (Step S3, S5, S7 and S9) for receiving data outputted from the terminals 22 and 24 and comparing the received data with the data inputted from the terminals 21 and 23, means (Steps S10 and S11) for identifying the specifications of the peripheral device. according to the result of comparison and outputting the identified information therefrom, and means (Steps S10 and S11) for performing control on the writing of the identified information into a predetermined memory. These means may be prepared as special configurations. However, if the function of the MPU 1 is used, then all the operations of these can be realized.

Figure 5:
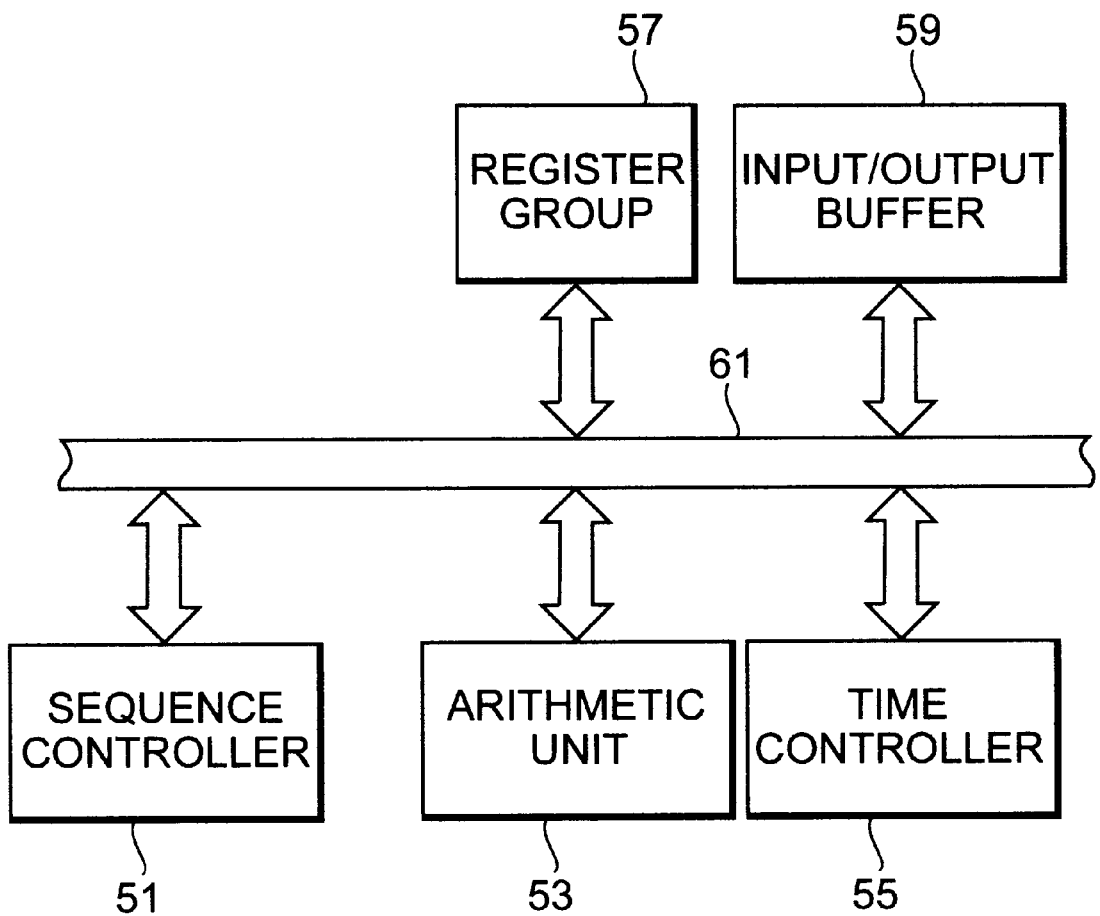
FIG. 5 is a diagram schematically showing the configuration of a MPU 1 shown in FIG. 1.

FIG. 5 schematic ally shows the structure of the MPU 1. The MPU 1 will be described using FIG. 5. Reference numerals 51, 53, 55, 57, 59 and 61 respectively indicate a sequence controller, an arithmetic unit, a timing controller, a register unit, other device such as an input/output buffer electrically connected to bus lines 7 to perform the transfer of data between the input/output buffer and the ROM 3 or the like, and an internal bus line.

The sequence controller 51 decodes read programs such as an identification program, control programs, etc. so as to generate signals for controlling the operation of other configurations or components. The arithmetic unit 53 performs arithmetic operations on various data. The timing controller 55 receives a clock signal and the like therein so as to control timing provided to activate the respective components. The register unit 57 has a plurality of registers for storing data or the like used for the arithmetic operations or the like therein. The internal bus line 61 is used to transfer data between the respective units referred to above.

In the MPU 1 constructed as described above, the sequence controller 51 decodes the identification program. The respective components are respectively controlled based on the result of decoding. For instance, the two registers of the register unit 57 are used as the means for generating the data "1" and "o" at the terminals 21 and 23 and outputting them. The data "1" and "0" are respectively stored in the two registers. The stored data may be supplied to the bus line 7 corresponding to the terminal 21 or 23 from the input/output buffer 59. Further, the arithmetic unit 53 is used as the means for making a comparison between the data inputted from the terminals 21 and 23. In the present embodiment, the arithmetic unit 53 performs an add operation because the result of addition becomes "2" or "0" when the data inputted from the terminals 21 and 23 coincide with each other, for example. The result of addition can be used as the result of comparison. Using, for example, the registers of the register unit 57 as the means for identifying the specifications of the peripheral device according to the result of comparison and outputting information about its identification therefrom and the means for controlling the identification information so as to be written into a predetermined memory, the sequence controller 51 output control signals according to the results of addition of the data stored in the registers. Respective identification information may be stored in the registers of the register unit 57, to which read instructions are given according to the control signals. Write instructions are made to the RAM 5 in response to the output of each control signal. In this case, it is necessary to control each target address in the RAM 5 to write the information thereat so that a predetermined address is given thereto in advance. It is needless to say that each address can be stored in its corresponding register or the like.

As described above, the identification program can be executed without the need for provision of a special configuration for the identification program. The operation of each portion in the MPU 1 is described by way of example to the end and is not necessarily limited to this.

A semiconductor device equipped with a peripheral device different in specifications from the above will next be described as a second embodiment with reference to FIG. 6.

Figure 6:
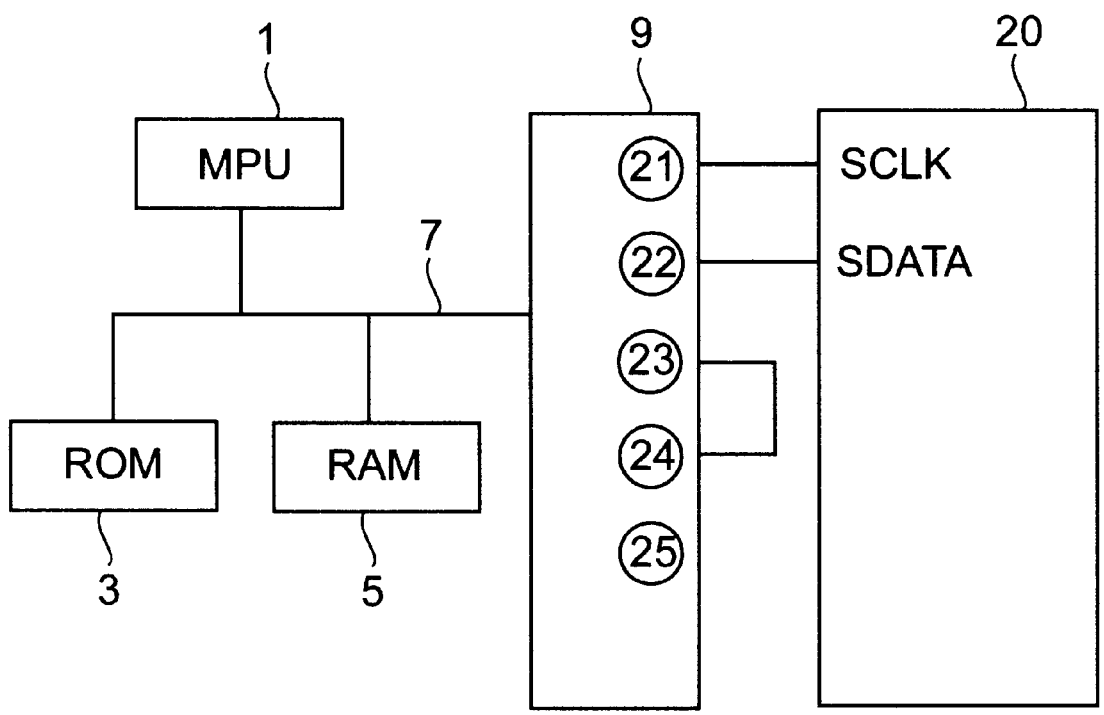
FIG. 6 is a block diagram illustrating the configuration of a semiconductor device according to a second embodiment of the present invention.

Referring to FIG. 6, the semiconductor device is characterized in that a two-wire type non-volatile memory 20 is electrically connected to an I/O port 9 as the peripheral device. Namely, two terminals corresponding to a serial clock terminal SCLK and a serial data terminal SDATA employed in the non-volatile memory 20 are respectively electrically connected to terminals 21 and 22 of the I/O port 9. Therefore, terminals 23 and 24 are short-circuited.

Figure 7:
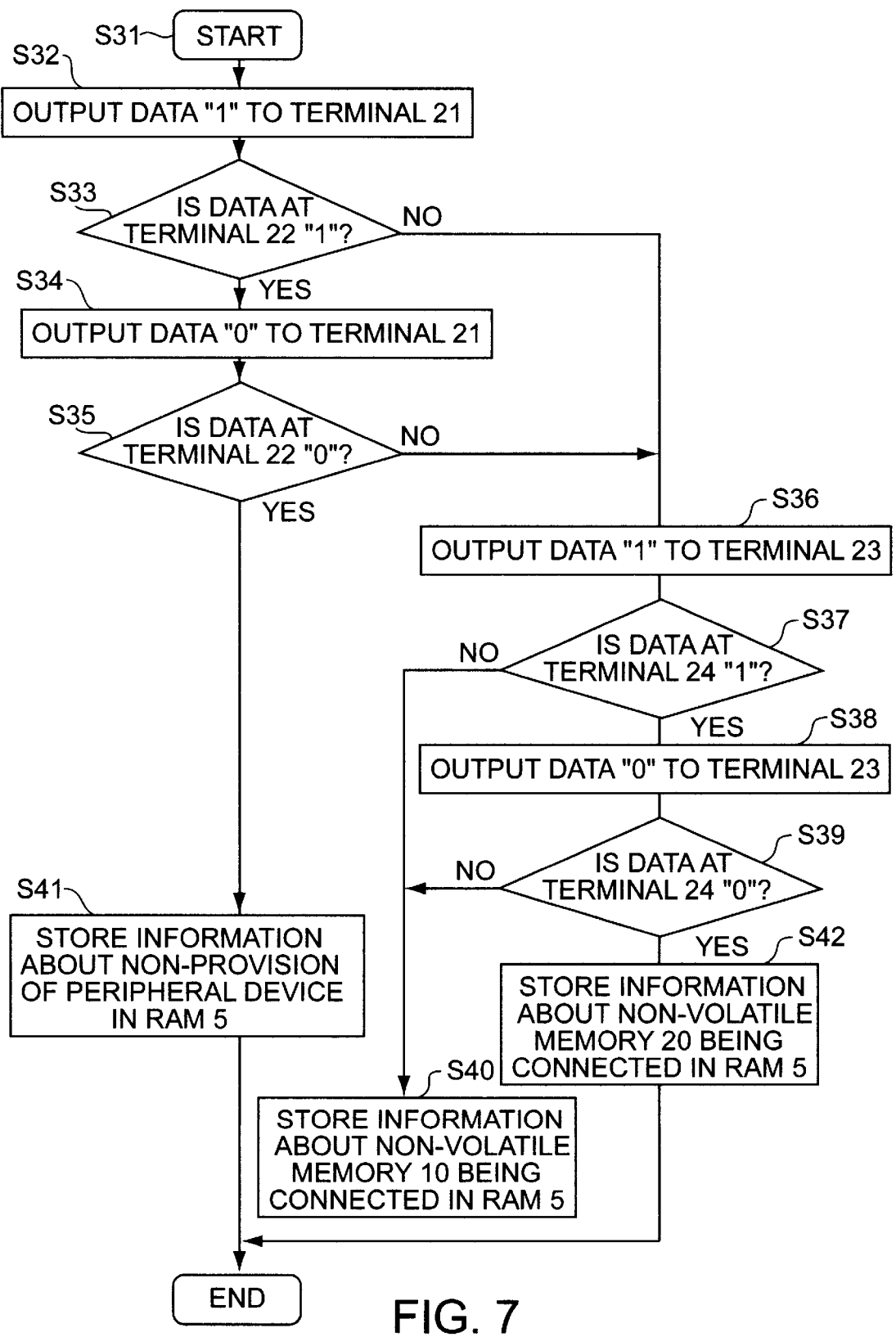
FIG. 7 is a flowchart for describing the contents of execution of an identification program capable of identifying the configuration of the semiconductor device according to the second embodiment of the present invention.

An identifying process based on FIG. 6 will be described using a flowchart shown in FIG. 7. Steps S31 through S35 are similar to Steps S1 through S5 shown in FIG. 3. Till Step S35, for example, the present semiconductor device is indistinguishable from one to which the five-wire type non-volatile memory 10 is connected as the peripheral device shown in FIG. 1. Thereafter, data "1" or data "0" is inputted to the terminal 23 (Steps S36 and S38). Further, the data inputted from the terminal 23 is compared with data received at the terminal 24 and it is determined whether they coincide with each other (Steps S37 and S39). It is thus possible to draw a distinction whether the non-volatile memory corresponding to the peripheral device belongs to the five-wire or two-wire type. Namely, since the terminals 23 and 24 are short-circuited in the case of the two-wire type, the result of coincidence is obtained even in Steps S37 and S39. Thus, a process of Step S42 and a process of Step S40 are respectively executed in the case of the two-wire type and the five-wire type. Further, when the semiconductor device is not equipped with the peripheral device, a process of Step S41 is executed. In the processes of Steps S40 through S42, data each indicative of the result of identification are respectively written into predetermined addresses in a RAM 5. When the peripheral device is of the five-wire type non-volatile memory and the two-wire type non-volatile memory and it is not provided, for example, data "11", data "01" and data "00" may be written into their corresponding addresses as data corresponding to the results of identification.

A special configuration may be prepared even for an identifying process employed in the second embodiment. It is however needless to say that since the identifying process is composed of process steps similar to those employed in the first embodiment, the identifying process can be executed based on a configuration that the MPU 1 has.

Figure 8:
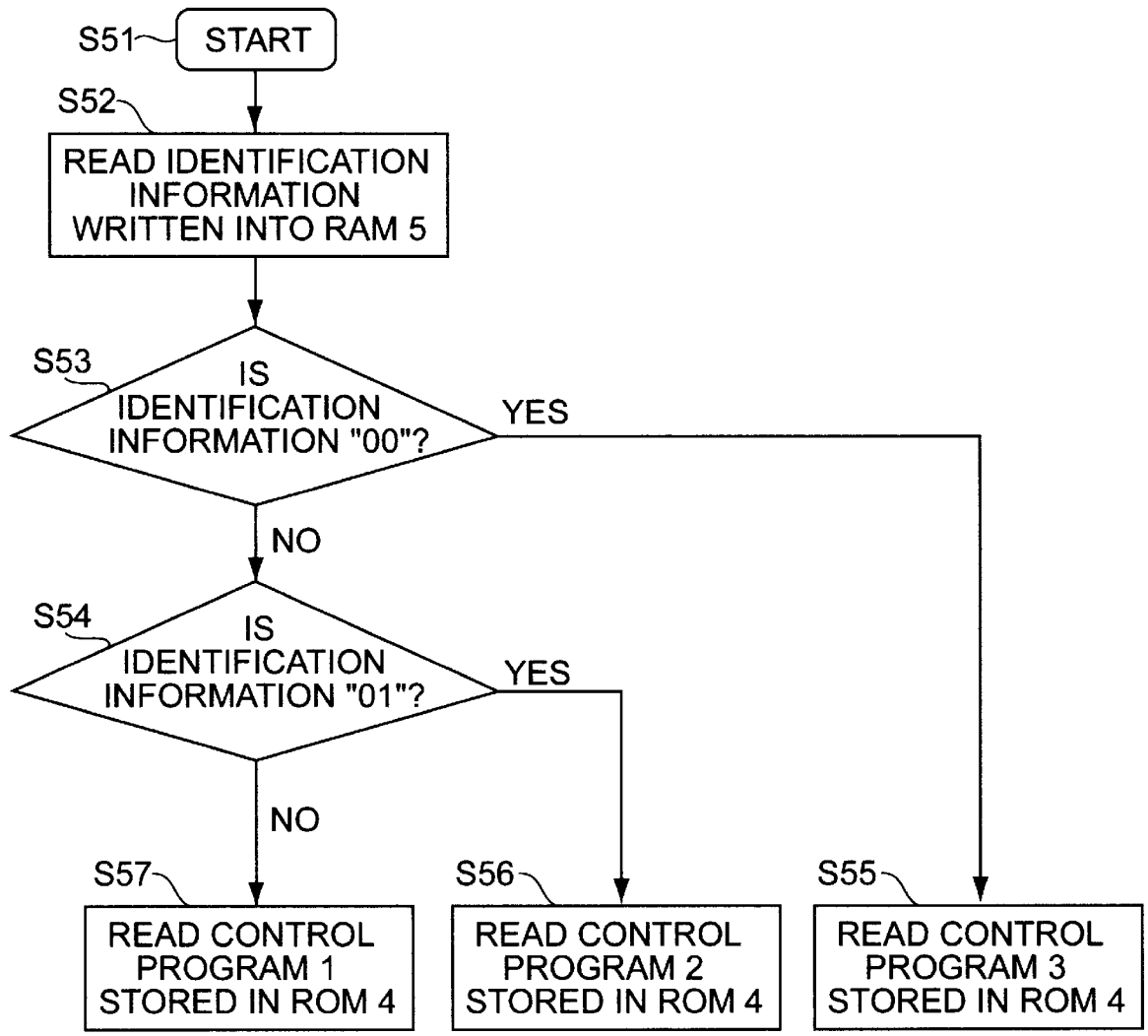
FIG. 8 is a flowchart for describing the selection of a control program using the result of identification.

The selection of control programs using the result of identification will now be described using a flowchart shown in FIG. 8.

This processing is carried out by the MPU 1 when, for example, the access to the peripheral device is required. If it is judged or determined that the access to the peripheral device is required (Step S51), then identification information is read from the RAM 5 (Step S52). It is determined whether the identification information is data "00" or data "01" (Steps S53 and S54). If the identification information is found to be the data "00", then a control program 3 stored between addresses 30000 and 3FFFF in a ROM 3 is read (Step S55). On the other hand, if the identification information is found to be the data "01", then a control program 2 stored between addresses 2000 and 2FFFF in the ROM 3 is read (Step S56). If the identification information is found not to belong to both data "00" and "01", then a control program 1 stored between addresses 10000 and 1FFFF in the ROM 3 is read (Step S57). Thus, the MPU 1 can obtain access to the peripheral device based on each control program corresponding to the specifications of the peripheral device. When the peripheral device is not provided, e.g., when the ROM 3 can be used as an alternative without providing the peripheral device even though an access request to the peripheral device is being made, the MPU 1 obtains access to the ROM 3.

Incidentally, the programs used for the selection processing may be stored in the ROM 3, for example. Further, a special connecting means may be provided for the select operation of the control programs using the result of identification. However, if one having a comparison function and a read function is used, then control processing can be executed in a manner similar to the identification program. It is therefore needless to say that the MPU 1 can execute its processing as an alternative as described above.

According to the first and second embodiments, as has been described above, control programs for a peripheral device, which are expected to be installed on a ROM of a semiconductor device in advance (inclusive of being not installed thereon), are prepared. Further, a process for identifying the specifications of the peripheral device and a process for reading a predetermined control program from the result of identification may be simply performed. Thus, even if the semiconductor device is equipped with peripheral devices of any specifications, it is unnecessary to perform control over the storage of their corresponding control programs. Thus, the semiconductor device can be prevented from increasing in fabrication complexity.

Particularly when control programs are prepared within a memory incorporated in an MPU, a photomask for manufacturing the MPU may be one type. It is thus possible to reduce an increase in cost.

Owing to the above-described effects, the conventional problems can be resolved even in the case of mass production.

Incidentally, the present invention is not necessarily limited to the operations of the aforementioned embodiments and the functions of the respective semiconductor devices. In the first embodiment, for example, the identification program is executed in accordance with Steps S1 through S11 as shown in FIG. 3. However, if it is desired to recognize only the presence or absence of provision of the peripheral device, then Steps S6 through S9 may not be performed. If a peripheral device connected to the connecting terminals 21 through 24 of the I/O port 9 is adopted, then the preparation of Steps S6 through S9 can be used for a confirmation as to whether the peripheral device is being properly connected to the I/O port 9.

As has been described above, since the semiconductor device selects the corresponding control program regardless of the presence or absence of provision of the peripheral device, the complexity of its manufacture can be avoided.

Since it is unnecessary to prepare a special circuit configuration for the above-described operations, the semiconductor device can be prevented from increasing in size.

Further, since the semiconductor device selects the corresponding control program regardless of the presence or absence and specifications of the peripheral device, it is possible to prevent the manufacture of the semiconductor device from becoming complex.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A method of identifying a peripheral device employed in a semiconductor device, said semiconductor device being equipped with a microprocessor and being capable of having said peripheral device electrically connected to the microprocessor at at least first and second connecting terminals and executing operations in cooperation with the microprocessor, comprising the following steps:

a first step for reading an identification program for identifying said peripheral device from a nonvolatile electrically programmable memory;

a second step for outputting a signal to said first connecting terminal;

a third step for receiving a signal outputted from said second connecting terminal;

a fourth step for comparing the signal outputted in said second step and the signal received in said third step;

a fifth step for identifying said peripheral device in response to the result of comparison obtained in said fourth step;

a sixth step for storing the result of identification therein;

a seventh step for selecting one of a plurality of control programs stored in the nonvolatile electrically programmable memory, according to the result of identification stored in said sixth step, the selected control program for accessing the peripheral device; and an eighth step of reading the selected control program to the peripheral device.

2. A method according to claim 1, wherein said semiconductor device includes first means for outputting the signal to said first connecting terminal, second means for receiving the signal outputted from said second connecting terminal, comparing means for comparing the signal outputted from said first means and the signal received by said second means and identifying means for identifying said peripheral device in response to the result of comparison by said comparing means.

3. A method according to claim 1, wherein said microprocessor performs a process for identifying said peripheral device in response to a request for the identification of said peripheral device.

4. The method of claim 1, wherein the seventh step includes mapping the result of identification stored in the sixth step to an address to locate the one of a plurality of control programs within the nonvolatile, electrically programmable memory.

5. A method according to claim 2, wherein said first means, said second means, said comparing means and said identifying means constitute said microprocessor.

6. A method of identifying a peripheral device employed in a semiconductor device, said semiconductor device being equipped with a microprocessor and being capable of having said peripheral device electrically connected to the microprocessor at at least first through fourth connecting terminals, executing operations in cooperation with the microprocessor and of being installed therein according to its specifications, comprising the following steps:

a step for storing an identification program for identifying said peripheral device employed in said semiconductor device in a first memory, the first memory being a nonvolatile, electrically programmable memory;

a step for outputting signals to said first and third connecting terminals respectively;

a step for receiving signals outputted from said second and fourth connecting terminals respectively;

a step for comparing the signals outputted in said outputting step and the signals received in said receiving step;

a step for identifying said peripheral device in response to the result of comparison obtained in said comparing step;

a step for storing the result of identification in a second memory, the second memory being volatile;

a step for selecting one of a plurality of control programs stored in the first memory, according to the result of identification stored in the second memory; and a step for reading the selected control program.

7. A method according to claim 6, wherein said semiconductor device has first means for outputting the signals to said first and third connecting terminals respectively, second means for receiving the signals outputted from said second and fourth connecting terminals respectively, comparing means for comparing the signal outputted from said first means and the signal received by said second means, and identifying means for identifying said peripheral device in response to the result of comparison by said comparing means.

8. A method according to claim 6, wherein said microprocessor performs a process for identifying said peripheral device according to a request for the identification of said peripheral device.

9. The method of claim 6, wherein the step of selecting includes mapping the result of identification stored in the step of storing the result of identification to an address to locate the one of a plurality of control programs within the first memory.

10. The method of claim 6, wherein the second memory is volatile.

11. A method according to claim 7, wherein said comparing means performs comparisons between the signals at said first and second connecting terminals and between the signals at said third and fourth connecting terminals and said identifying means identifies the type of peripheral device installed in said semiconductor device from the results of comparisons by said comparing means.

12. A method of identifying a peripheral device employed in a semiconductor device, the semiconductor device including a microprocessor and being capable of having the peripheral device electrically connected to the microprocessor at at least first and second connecting terminals and executing operations in cooperation with the microprocessor, the method comprising:

reading from a nonvolatile, electrically programmable memory an identification program for identifying the peripheral device;

outputting a signal to the first connecting terminal;

receiving a signal outputted from the second connecting terminal;

comparing the signal outputted to the first connecting terminal and the signal received from the second connecting terminal;

identifying the peripheral device if a result of comparison obtained in said comparing is that the signal outputted to the first connecting terminal does not coincide with the signal received from the second connecting terminal; and storing the result of identification.

13. The method of claim 12, further comprising storing information indicative of no peripheral device being connected to the first and second connecting terminals if a result of comparison obtained in said comparing is that the signal outputted to the first connecting terminal coincides with the signal received from the second connecting terminal.

14. The method of claim 12, further comprising selecting one of a plurality of control programs stored in the nonvolatile, electrically programmable memory, according to the result of identification stored in said storing the result, the selected control program for accessing the peripheral device; and reading the selected control program to the peripheral device.

15. The method of claim 12, wherein the semiconductor device is capable of having the peripheral device electrically connected to the microprocessor at at least first through fourth connecting terminals, and wherein the method further comprises:

outputting a further signal to the third connecting terminal;

receiving a signal outputted from the fourth connecting terminal;

further comparing the signal outputted to the third connecting terminal and the signal received from the four connecting terminal; and identifying the peripheral device if a result of comparison obtained in said further comparing is that the signal output to the third connecting terminal does not coincide with the signal received from the fourth connecting terminal.

16. The method of claim 12, wherein the storing the result includes storing the result in a volatile memory.

17. The method of claim 14, wherein said selecting includes mapping the stored result of identification to an address to locate the one of a plurality of control programs within the nonvolatile, electrically programmable memory.

18. The method of claim 15, further comprising storing information indicative of no peripheral device being connected to the first through fourth connecting terminals if a result of comparison obtained in said comparing and further comparing is that the signals outputted to the first and third connecting terminals coincide respectively with the signal received from the second connecting terminal and the signal received from the fourth connecting terminal.

19. The method of claim 15, further comprising selecting one of a plurality of control programs stored in the nonvolatile, electrically programmable memory, according to the result of identification stored in said storing the result, the selected control program for accessing the peripheral device; and reading the selected control program to the peripheral device.

20. The method of claim 19, wherein said selecting includes mapping the stored result of identification to an address to locate the one of a plurality of control programs within the nonvolatile, electrically programmable memory.

* * * * *

UNITED STATES PATENT AND TRADEMARK OFFICE
CERTIFICATE OF CORRECTION

PATENT NO.   : 6,032,254
DATED        : February 29, 2000
INVENTOR(S)  : Hiroshi KUME It is certified that error appears in the above-identified patent and that said Letters Patent is hereby corrected as shown below:

IN THE CLAIMS

Column 9, line 12, after "of" change "reading" to --using--; and line 13, before "the" insert --access--.

Signed and Sealed this

Fourteenth Day of November, 2000

Attest:

Q. TODD DICKINSON

Attesting Officer

Director of Patents and Trademarks